United States Patent [19]

Narasawa et al.

[11] Patent Number: 4,603,359
[45] Date of Patent: Jul. 29, 1986

[54] ROTARY HEAD DEVICE

[75] Inventors: Takashi Narasawa, Kanagawa; Makoto Fujiki, Tokyo; Tatsuzo Ushiro, Tokyo; Hiroo Edakubo, Tokyo, all of Japan

[73] Assignee: Canon Kabushiki Kaisha, Tokyo, Japan

[21] Appl. No.: 398,825

[22] Filed: Jul. 16, 1982

[30] Foreign Application Priority Data

Jul. 24, 1981 [JP] Japan .................................. 56-116069
Jul. 24, 1981 [JP] Japan .................................. 56-116070

[51] Int. Cl.$^4$ ............................ G11B 5/52; G11B 15; G11B 60
[52] U.S. Cl. ..................................... 360/84; 360/107; 360/130.24
[58] Field of Search ..................... 360/107, 108–109, 360/84, 85, 95, 130.22, 130.23, 130.24; 310/67 R, 68 D

[56] References Cited

U.S. PATENT DOCUMENTS

| 4,058,845 | 11/1977 | Zahn | 360/107 |
| 4,212,042 | 7/1980 | Koshelev et al. | 360/108 |
| 4,251,840 | 2/1981 | Maruyama et al. | 360/107 |
| 4,314,284 | 2/1982 | Sato et al. | 360/107 |
| 4,354,211 | 10/1982 | Gilovich et al. | 360/84 |
| 4,366,519 | 12/1982 | Maruyama et al. | 360/108 |
| 4,408,239 | 10/1983 | Ushiro | 360/84 |

Primary Examiner—John H. Wolff
Assistant Examiner—David J. Severin
Attorney, Agent, or Firm—Toren, McGeady, Stanger, Goldberg & Kiel

[57] ABSTRACT

A rotary head device for a rotary head-type magnetic recording/reproducing apparatus comprising a fixed drum and a rotary member which has a magnetic head disposed therein is provided with a ball bearing which is formed by inserting a plurality of rolling members into annular grooves which are respectively formed in the fixed drum and the rotary member on their opposed sides and are located adjacently to their peripheries.

17 Claims, 12 Drawing Figures

ROTARY HEAD DEVICE

BACKGROUND OF THE INVENTION

1. Field of the Invention

This invention relates to an improvement in a conventional rotary head device for a magnetic recording/reproducing apparatus.

2. Description of the Prior Art

The size of rotary head type magnetic recording/reproducing apparatus (VTRs) has recently been reduced to a significant extent. As a result, portable VTRs are becoming more popular. To meet this tendency, efforts have been made to reduce the size and thickness of rotary head devices for such VTRs. Such efforts, however, have approached a structurally allowable limit. A typical example of conventional rotary head devices is shown in FIG. 1 of the accompanying drawings. In the conventional device, a rotating shaft 2 is disposed at the center of a fixed lower drum 1. The rotating shaft 2 is rotatably attached to the fixed lower drum 1 by bearings 3 and 4. A rotary upper drum 5 which is opposed to the fixed lower drum 1 is attached to a support member 6 by a mounting screw 7. The support member 6 is secured to the rotating shaft 2 above the bearing 3. The rotary upper drum 5 is thus arranged to be rotatable relative to the fixed lower drum 1. At least one head base plate 10 which is provided with a magnetic head 9 is mounted on the rotary upper drum 5 by mounting screws 11. The peripheral faces of the rotary upper drum 5 and the fixed lower drum 1 serve as magnetic tape travelling faces. A winding 12 on the rotating side of a rotary transformer is mounted on the support member 6 while a winding 13 on the stationary side thereof is mounted on the fixed lower drum 1 opposite to the winding 12. The winding 12 on the rotating side is connected to the magnetic head 9. Input and output signals to and from the magnetic head 9 are thus arranged to pass through the magnetic coupling of the rotary transformer.

Another support member 14 is mounted on a part of the rotating shaft 2 below the bearing 4. A rotary yoke 16 of a motor 15 is mounted to the support member 14 by means of a mounting screw 17. The rotary yoke 16 has a rotary magnet 18 secured thereto. Opposite to the rotary magnet 18, there are provided a stator 19 and a stator coil 20 which is secured to the fixed lower drum 1.

In the conventional rotary head device shown in FIG. 1, the rotary upper drum 5 is mounted on the rotating shaft 2 while the rotating shaft 2 is supported by the bearings 3 and 4. Such being the arrangement, if the spacing between these bearings 3 and 4 is arranged to be short, the rotation locus of the magnetic head 9 would be affected and the head 9 would be prevented from making a precise rotation by a tilt of the rotating shaft 2 due to deviation of the bearings 3 and 4 from their prescribed relative positions. Because of this problem, it has been extremely difficult to reduce the thickness of a rotary head device in the axial direction thereof. Further, in accordance with the conventional arrangement, the rotation precision of the rotary upper drum 5 consists of the sum of the degrees of precision of bearings 3 and 4, the rotating shaft 2, the support member 6 and the rotary upper drum 5. Accordingly, a great expenditure has been necessary in order to secure the individual precision of these parts as well as the engagement precision between them. Another problem of the conventional device resides in that the pre-load setting for the bearings 3 and 4 is effected by fixing the support member 6 to the rotating shaft 2. However, since the fixed lower drum 1 and the rotating shaft 2 differ from each other in thermal expansion coefficient, temperature variations tend to cause the pre-load on the bearings 3 and 4 to disappear.

SUMMARY OF THE INVENTION

The present invention is directed to the solution of the above-mentioned problems of the conventional devices. It is therefore an object of the invention to provide a rotary head device which permits reduction in the thickness thereof or in its dimension in the axial direction thereof and is capable of enhancing rotation precision with a reduced number of parts for reduction in cost.

It is another object of the invention to provide a rotary head device which obviates the fear of disappearance of the pre-load imposed on the bearing due to temperature variations.

To attain these objects, the rotary head device according to the invention is provided with at least one annular groove which is formed in a rotary member having a magnetic head and is arranged on the side face thereof perpendicular to its axis of rotation at a part close to the periphery thereof. Another annular groove is formed on the side of a fixed drum opposed to the above-stated annular groove. Then, a plurality of rolling members are inserted in between these two annular grooves to form a ball bearing between the rotary member and the fixed drum.

Further, it is a feature of the invention that the rotary head device according to the invention is provided with magnetic means which applies a pre-load to the bearing by virtue of a magnetic force without coming in contact with the rotary member.

These and further objects and features of the invention will become apparent from the following detailed description thereof taken in connection with the accompanying drawings.

DETAILED DESCRIPTION OF THE PREFERRED EMBODIMENTS

Figure 2:
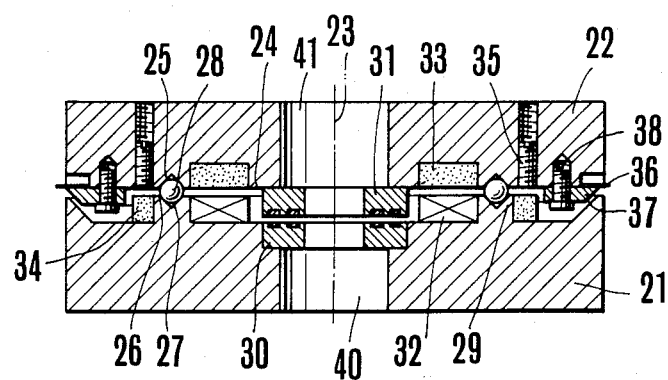
FIG. 2 is a sectional view showing a rotary head device as an embodiment of the invention.

An embodiment of the invention is arranged as shown in FIG. 2. In this case, the invention is applied to an upper drum rotating method. A rotary upper drum 22 is disposed opposite to a fixed lower drum 21. The peripheral faces of the two drums 21 and 22 are arranged to allow a tape to travel thereover. The rotary upper drum 22 is provided with an annular groove part 25 which is formed in the drum 22 on its side in a planar surface part 24 disposed perpendicularly to the axis of rotation of the drum 22, the groove 25 being adjacent to the outer periphery of the surface part 24. Meanwhile, the fixed lower drum 21 is provided with an annular groove part 27 which is formed therein on one side of the drum 21 in a planar surface part 26 and is opposed to the annular groove part 25. A plurality of steel balls 28 are inserted in between the two groove parts 25 and 27. The two annular groove parts 25 and 27 and the steel balls 28 jointly form a ball bearing 29. On the opposed sides of the fixed lower drum 21 and the rotary upper drum 22 there are provided a stationary-side winding 30 and a rotary-side winding 31 of a signal transmitting rotary transformer; a stator coil 32 of a motor; a rotary magnet 33; a pre-load magnet 34 which is provided for the purpose of supporting the rotary upper drum 22 and adjusting a pre-load imposed on the ball bearing 29; and pre-load adjustment screws 35. A head base plate 37 which is provided with a magnetic head 36 is mounted on the rotary upper drum 22 by means of mounting screws 38.

An attraction force between the pre-load magnet 34 and the pre-load adjustment screw 35 is adjusted by adjusting the pre-load adjustment screw 35. With the attraction force adjusted in this manner, the pre-load provided for holding the rotary upper drum 22 and applied to the steel balls 28 of the ball bearing 29 are adjusted in a non-contacting manner.

When power is supplied from a drive circuit (not shown) to the stator coil 32, the rotary magnet 33 exerts a rotating force to cause the rotary upper drum 22 to rotate over the fixed lower drum 21 while the rotary upper drum 22 is being carried by the ball bearing 29. A magnetic tape (not shown) is wound on the peripheral faces of the fixed lower drum 21 and the rotary upper drum 22 and is thus arranged to travel thereover. A recording or reproducing operation is accomplished by a rotative scanning action of the magnetic head 36 which rotates at a higher speed than the travelling speed of the magnetic tape.

Signals transmitted between the magnetic head 36 and the magnetic tape are supplied to or received from a signal processing circuit through the rotating-side and stationary-side windings 31 and 30 of the rotary transformer.

In accordance with the embodiment of the invention, the ball bearing 29 is provided on the side of the rotary upper drum 22 which is perpendicular to the rotation center thereof and is positioned adjacent to the peripheries of the two drums 21 and 22. This arrangement permits reduction in thickness to a great extent. In the case of the typical example of the conventional devices shown in FIG. 1, the bearings 3 and 4 are provided on the rotation shaft 2 and a required degree of rotatory precision is secured by a spacing distance between the bearings 3 and 4 whereas, such spacing arrangement is unnecessary in accordance with the invention. Further, in this particular embodiment, the bearing is arranged adjacent to the peripheries of the two drums. Therefore, compared with an arrangement having bearings disposed in the middle part of the device, the peripheral faces of the drums are affected to a lesser degree by the error of the bearing arrangement, so that the rotatory precision can be enhanced. As will be clearly understood from FIG. 2, the ball bearing of the embodiment is positioned closer to the periphery than to a middle point between the periphery and the rotation center. Therefore, displacement in the position of the bearing becomes about equal to displacement of the magnetic head, so that a high degree of rotative precision can be obtained.

Further, the rotative precision of the rotary upper drum 22 is determined only by the bearing 29 and the rotation of the rotary upper drum 22 itself. There are involved no other members such as the rotation shaft 2 and the support member 6 shown in FIG. 1. In the case of this embodiment, therefore, the number of parts that require high precision is significantly reduced. As a result of this, the rotative precision can be enhanced with a lesser number of parts and at a lower cost. Further, in the embodiment, there are provided void holes 40 and 41 respectively in the fixed lower drum 21 and the rotary upper drum 22. Meanwhile, for stable rotation of the rotary upper drum 22, it is preferable that the rotary drum has a large force of inertia.

Assuming that the mass of the rotary upper drum 22 is m and the radius thereof r, the rotative inertia force I can be expressed as follows:

$$I = \Sigma m_i \cdot r_i^2$$

Further, assuming that the specific gravity $\phi$ is unvarying, the mass mi can be expressed as $m_i = \pi r_i^2 \times \phi$. Therefore, even with the void hole provided in the middle part, the rotative inertia force is slightly lessened thereby, so that the provision of the void holes permits reduction in weight.

Figure 1:
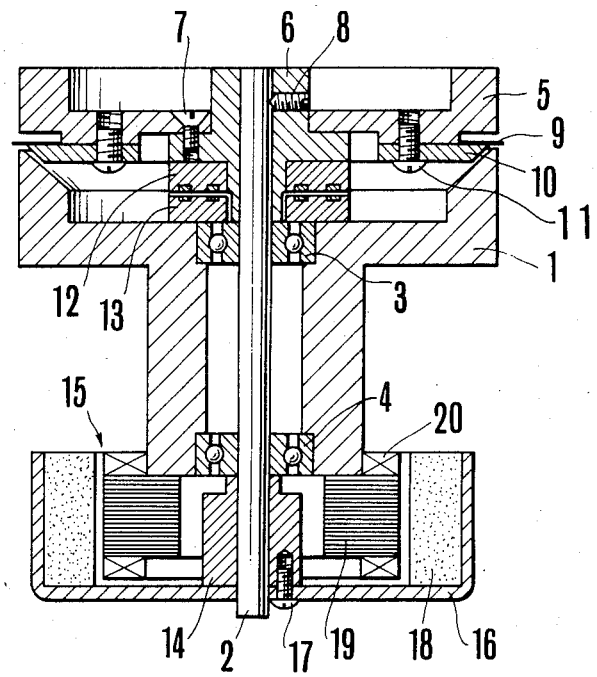
FIG. 1 is a sectional view showing an example of the conventional rotary head device.

In the conventional device shown in FIG. 1, the pre-load on the bearings 3 and 4 is adjusted in a complicated manner. For example, at the time of fixing the support member 6 to the rotation shaft 2, the member is fixed either with a load current which flows to the stator coil 20 used as index or with a weight which is equivalent to the pre-load mounted on the support member 6. However, in the case of this embodiment, the pre-load adjustment can be readily carried out by merely adjusting the pre-load adjustment screws 35. Besides, since the adjustment can be carried out with the rotary upper drum 22 kept above the fixed lower drum 21, the cost of pre-load adjustment can be lessened. Further, in the case of the conventional device shown in FIG. 1, if the thermal expansion coefficient of the rotation shaft 2 is smaller than that of the fixed lower drum 1, the pre-loads on the bearings 3 and 4 tend to disappear at the time of a temperature drop. Whereas, since this embodiment is arranged to give pre-load in a non-contacting manner, there is no fear of disappearance of the pre-load.

As for replacement work on the magnetic head 36, in the conventional device, the magnetic head 36 is replaced after the rotary upper drum 5 is removed from the support member 6. However, since the two parts are high-precision products and are in tightly fitted engagement with each other for the purpose of obtaining a high degree of rotatory precision, the workability of the rotary upper drum 5 has been extremely poor for removing and mounting the drum 5. In the case of this embodiment on the other hand, since the rotary upper drum 22 is carried by a magnetic force in a non-contacting manner above the fixed lower drum 21, the rotary upper drum 22 of the embodiment can be readily removed and mounted.

Another advantage of this embodiment resides in that the rotary upper drum 22 is a sole rotating member. Therefore, the mounting plane of the head base plate 37 and that of the rotating side winding 31 of the rotary transformer can be arranged on the same plane to facilitate obtaining the required degree of precision. Therefore, this permits further reduction in cost.

Figure 3:
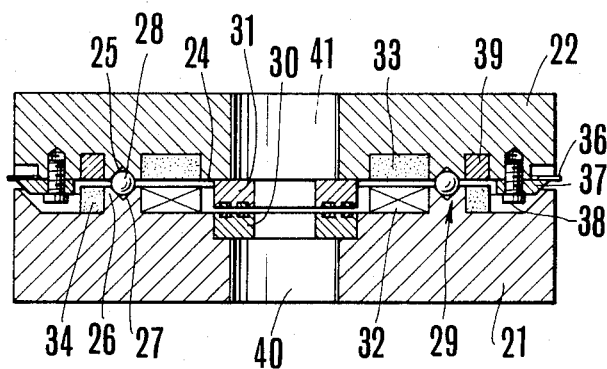
FIG. 3 is a sectional view showing another embodiment of the invention.
Figure 4:
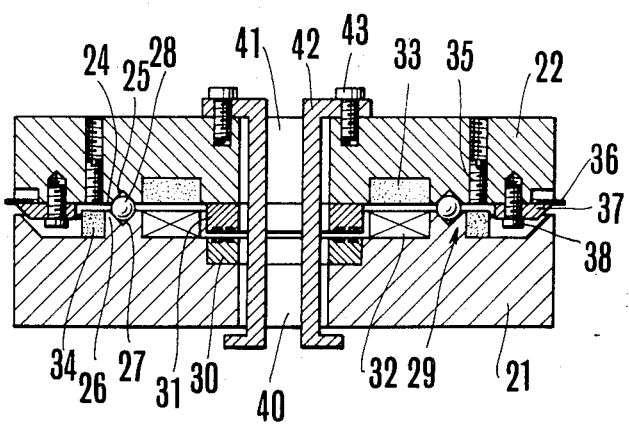
FIG. 4 is a sectional view showing a further embodiment of the invention.

Modification examples of the embodiment shown in FIG. 2 are as shown in FIGS. 3 and 4. In these drawings, like reference numerals designate like or corresponding parts.

Referring to FIG. 3, when the pre-load on the ball bearing 29 is insufficient, the pre-load adjustment screws 35 may be replaced with an annular magnetic member 39 made of a material such as iron, which is disposed in a position opposite to the pre-load magnet 34. This arrangement gives a stronger magnetic attraction between the magnetic member 39 and the pre-load magnet 34 to give a sufficient pre-load. In the case of the modification shown in FIG. 3, the magnetic member 39 is fixedly attached to the rotary upper drum 22. However, the position of the magnetic member 39 may be arranged to be adjustable upward or downward by providing the magnetic member 39 with screws. Further, the rotary magnet 33 may be arranged to perform an additional function as the pre-load magnet 34. Where the stator coil 32 is arranged to have an iron core, the iron core may be arranged to perform an additional function as pre-load magnet.

A sufficient pre-load can be obtained for holding the rotary upper drum 22 and for the ball bearing 29 from the arrangement of the pre-load magnet 34 and the pre-load adjustment screws 35 or the magnetic member 39. However, to prevent the rotary upper drum 22 from being caused to pull out by an accidental shock, retaining members 42 are arranged through the void holes 40 and 41 which are located in the middle parts of the fixed lower drum 21 and the rotary upper drum 22 as shown in FIG. 4. The lower ends of the retaining members 42 are bent into an L shape. These lower ends of the retaining members hook on the drum 21 to prevent the drum 22 from pulling out. While two retaining members 42 are shown in FIG. 4, the number of the retaining members is not limited to two but one, three or more than three of them may be used.

Figure 5:
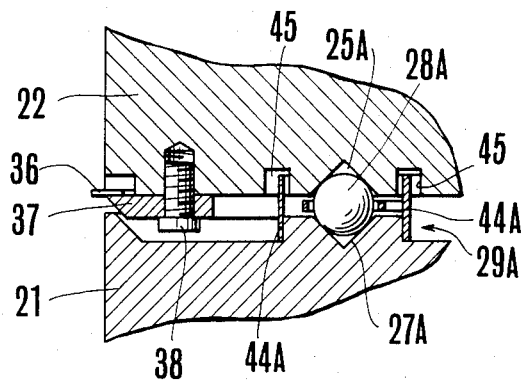
FIGS. 5, 6 and 7 are sectional view showing ball bearings respectively embodying the invention in different manners.
Figure 6:
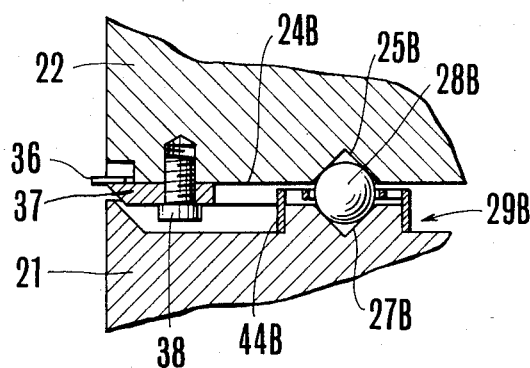
Figure 7:
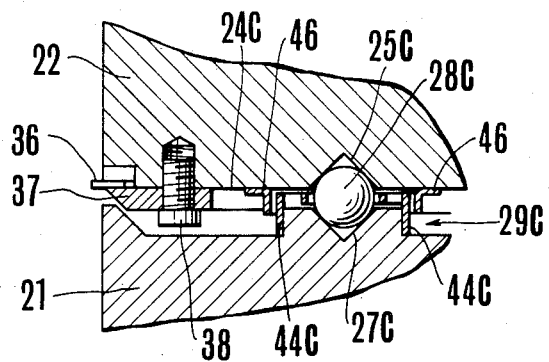

The details of the ball bearing 29 are as shown by way of example in FIGS. 5, 6 and 7. In the case of FIG. 5, the fixed lower drum 21 is provided with shield walls 44A which are disposed in the vicinity of the steel balls 28A. Meanwhile, the rotary upper drum 22 is provided with shield grooves 45 which are positioned opposite to these shield walls 44A of the fixed lower drum 21 and are arranged to have the shield walls 44A respectively inserted into them. This arrangement not only shields the grease provided within the ball bearing but also prevent dust from entering there from outside.

It is also possible to have shield walls 44B of the fixed lower drum 21 extended close to the end face 24B of the rotary upper drum 22 as shown in FIG. 6 without providing the shield grooves 45. Further, as shown in FIG. 7, the rotary upper drum 22 may be provided with shield walls 46 which are arranged on the face 24C of the drum to overlap shield walls 44C provided on the fixed lower drum 21.

Figure 8:
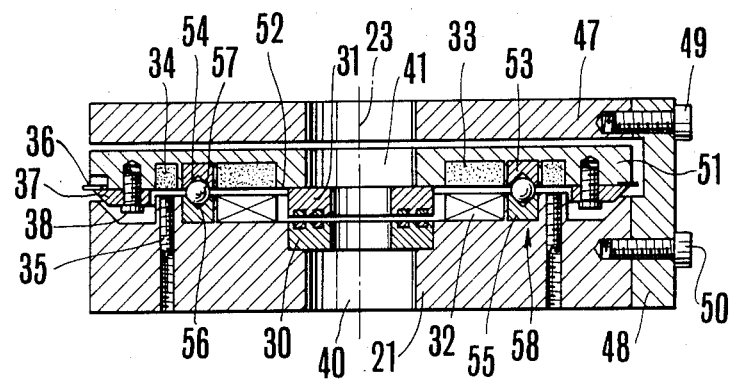
FIGS. 8–12 are sectional views showing still further embodiments of the present invention.

In another embodiment of the invention, the invention is applied to an intermediate drum rotating system as shown in FIG. 8. In FIG. 8, the parts of the embodiment similar to the parts shown in FIG. 2 are indicated by the same reference numerals as those used in FIG. 2. In this case, a fixed upper drum 47 is secured to the fixed lower drum 21 through a coupling member 48 and mounting screws 49 and 50. There is provided an intermediate drum 51 which is arranged to serve as the rotary member of the invention and is disposed between the fixed upper drum 47 and the fixed lower drum 21. For reduction in weight, the fixed upper drum 47, the fixed lower drum 21 and the intermediate drum 51 are made of an aluminum alloy. The intermediate drum 51 is provided with a rotary annular member 53 which has an end face thereof arranged perpendicularly to the rotation center 23 of the intermediate drum 51 and on the same plane as the end face 52 of the intermediate drum 51 positioned opposite to the fixed lower drum 21. The rotary annular member 53 is positioned adjacent to the periphery of the intermediate drum 51. An annular groove 54 is provided in one side of the rotary annular member 53. Meanwhile, a fixed annular member 55 is mounted on the fixed lower drum 21 and is positioned opposite to the rotary annular member 53. The fixed annular member 55 is also provided with an annular groove 56 which is formed in one side of the fixed annular member 55. Between the two annular grooves 54 and 56 are inserted a plurality of steel balls 57. A ball bearing 58 is formed by the rotary annular member 53, the fixed annular member 55 and the steel balls 57. These components of the ball bearing 58 are all made of a metal material that does not be deformed much by pressure, such as stainless steel, high carbon steel, etc. The annular groove parts 54 and 56 may be directly formed in the intermediate drum 51 and the fixed lower drum 21 as in the case of the embodiment shown in FIG. 2 instead of forming them in the annular members.

In accordance with the arrangement of this embodiment, the durability of the ball bearing can be increased in addition to reduction in the weight of the drum arrangement and the thickness of the device.

Figure 9:
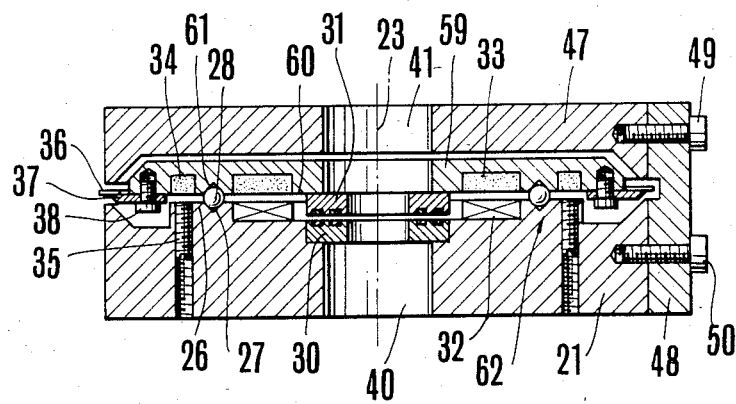

FIG. 9 shows a further embodiment in which the invention is applied to a head-on-propeller rotating system. In FIG. 9, the parts similar to those shown in FIGS. 2 and 8 are indicated by the same reference numerals as those used in FIGS. 2 and 8. The embodiment includes a head bar 59 which corresponds to the rotary member of the invention and is disposed between the fixed upper drum 47 and the fixed lower drum 21. The head bar 59 is provided with an annular groove part 61 which is formed in the side of the head bar 59 positioned perpendicular to the rotation center 23 thereof and is located adjacent to the periphery of the head bar 59. Another annular groove part 27 is formed in the fixed lower drum 21 on the side 26 and is positioned opposite to the other annular groove part 61. In between these two annular groove parts 61 and 27 are inserted a plurality of steel balls 28. The annular groove parts 61 and 27 and the steel balls 28 jointly form a ball bearing 62.

The operation and the advantageous effects of this embodiment are almost the same as those of other embodiments shown in FIGS. 2 and 8.

Figure 10:
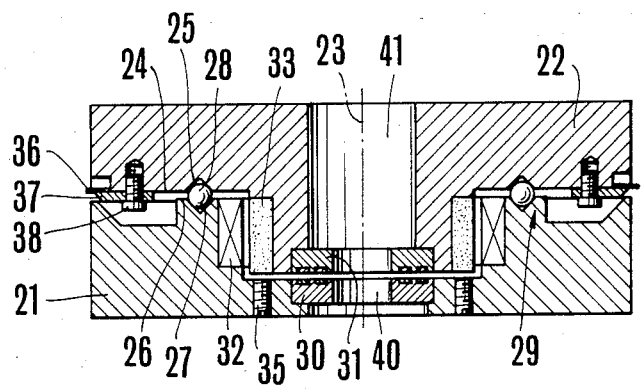

FIG. 10 shows a further embodiment of the invention in which a peripherally opposed driving method is employed with an upper drum arranged to rotate. The parts of the embodiment similar to those shown in FIG. 2 are indicated by the same reference numerals as those used in FIG. 2. A stator coil 32 and a rotary magnet 33 are respectively attached to the opposed circumferential faces of the fixed lower drum 21 and the rotary upper drum 22 and are thus positioned to confront each other. In this particular embodiment, the rotary magnet 33 is arranged to perform an additional function as pre-load magnet.

Figure 11:
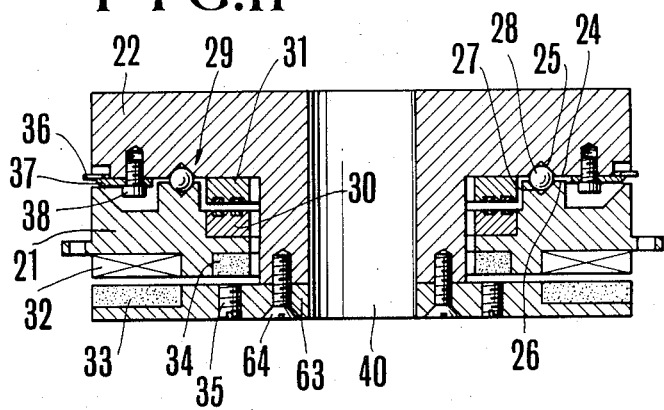

FIG. 11 shows another embodiment of the invention in which a surface opposed outer rotor method is employed with the upper drum arranged to rotate. The parts of the embodiment similar to those shown in FIG. 2 are indicated by the same reference numerals as those used in FIG. 2. In this embodiment, the rotary magnet 33 of the motor and pre-load adjustment screws 35 are mounted to a support member 63 which is attached to upper drum 22 by means of mounting screws 64.

Figure 12:
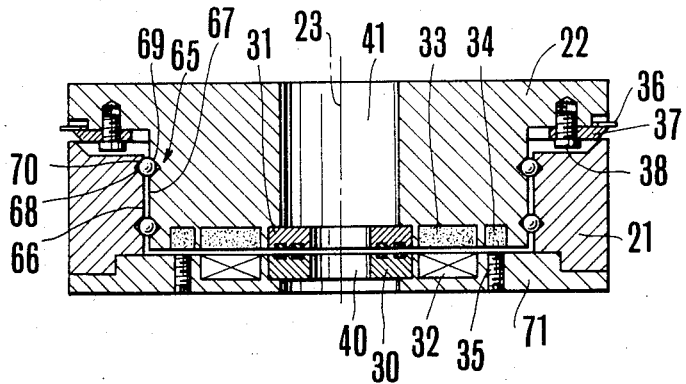

A still further embodiment of the invention is as shown in FIG. 12. In this embodiment, ball bearings 65 are arranged between opposed circumferential faces 66 and 67 of the rotary upper drum 22 and the fixed lower drum 21. The rotary upper drum 22 is provided with two annular groove parts 69, which are formed in a circumferential side 66 of the drum 22 confronting the drum 21. Meanwhile, the fixed lower drum 21 is provided also with two annular groove parts 68 which are formed in a circumferential side 67 of the drum 21. A plurality of steel balls 70 are inserted in between these annular groove parts 68 and 69. The ball bearings 65 are formed jointly by these annular groove parts 68 and 69 and the steel balls 70. The annular groove parts 68 and 69 may be formed in separate members respectively secured to the two drums 22 and 21.

A fixed member 71 has pre-load adjustment screws 35, a stator coil 32 and a stationary-side winding 30 of a rotary transformer attached thereto. Meanwhile, a pre-load magnet 34, a rotary magnet 33 and the rotating-side winding 31 of the rotary transformer are mounted respectively on the rotary upper drum 22.

In this embodiment, since the opposed circumferential sides 66 and 67 are located close to the periphery of the device, the ball bearings 65 have a large diameter. The influences of the positional deviations of the ball bearings 65 over the locus of the magnetic head 36 are in a ratio close to 1:1 and thus become irrelevant to spacing distance between the two ball bearings 65. Therefore, this embodiment permits reduction in thickness by lessening the distance between the two ball bearings 65. The rotation precision of the rotary upper drum 22 is determined solely by the ball bearings 65 in addition to the rotation precision of the rotary upper drum 22 itself and is not affected by any other members such as the rotation shaft 2 and the support member 6 which are shown in FIG. 1. Therefore, the number of parts requiring a high degree of precision is lessened to a great extent, so that rotation precision can be increased with a lesser number of parts and at a low cost. The adjustment of the pre-load can be accomplished in the same manner as in the embodiment shown in FIG. 2 to effectively prevent the pre-load from disappearing and the cost required for the pre-load adjustment likewise can be lowered.

In the embodiments described above, steel balls 28, 57 and 70 are used as rolling members for the bearings 29, 58, 62 and 65. However, these steel balls may be replaced with rollers. Further, the ball bearings 29, 58 and 62 are singly used in each of the embodiments shown in FIGS. 2-11. However, the single use of the bearing may be replaced with use of two or more bearings. Conversely, the use of two bearings 65 in the embodiment shown in FIG. 12 may be replaced with use of one bearing.

As described in the foregoing, in accordance with the invention, the ball bearing is provided between a side face of the rotary member which is perpendicular to the rotation center of the rotary member and a side face of the fixed drum and is located closer to their peripheries. The arrangement thus permits reduction of dimension in the axial direction of the device to effect a thinner configuration. Further, the invention dispenses with the rotation shaft and the support member which have been used for the conventional device, so that the rotation precision can be enhanced with a lesser number of parts and at a lower cost. Further, the provision of the magnetic means according to the invention enables the rotary member to be carried above the fixed drum by means of a magnetic force. This arrangement precludes the possibility of removal of the pre-load on the ball bearing by a change in temperature.

Further, it is to be understood that the invention is not limited to these embodiment examples given in the foregoing and that within the scope of the appended claims, the invention may be practiced otherwise than as specifically described.

What we claim:

1. A rotary head device comprising:
   a fixed drum having a first planar surface part and a first annular groove formed in said first planar surface part adjacent to an outer periphery thereof;
   a rotary member arranged to be rotatable relative to said fixed drum, said rotary member having a second planar surface part and a second annular groove formed in said second planar surface part, said rotary member being disposed so that said second planar surface part and said second groove confront said first planar surface part and said first groove, of the fixed drum, respectively;
   at least one head supported by and rotatable together with said rotary member;
   rotary driving means for driving said rotary member;
   a plurality of rolling members inserted between said first and second annular grooves, said rolling members being arranged to form a ball bearing jointly with said first and second annular grooves;
   a void hole defined on said rotary member at a position of the rotation center thereof; and
   a retaining member for preventing said rotary member from pulling away from said fixed drum, said retaining member being arranged by utilizing said void hole of said rotary member.

2. A rotary head device comprising:
   a fixed drum having a first planar surface part and a first annular groove formed in said first planar surface part adjacent to an outer periphery thereof;
   a rotary member arranged to be rotatable relative to said fixed drum, said rotary member having a second planar surface part and a second annular groove formed in said second planar surface part, said rotary member being disposed so that said second planar surface part and said second groove confront said first planar surface part and said first groove, of the fixed drum, respectively;
   at least one head supported by and rotatable together with said rotary member;
   rotary driving means for driving said rotary member;
   a plurality of rolling members inserted between said first and second annular grooves, said rolling members being arranged to form a ball bearing jointly with said first and second annular grooves; and
   pressure means for applying pressure on said ball bearing.

3. A rotary head device according to claim 2, wherein said rotary driving means is arranged at a radially more inner position than said first and second annular grooves.

4. A rotary head device according to claim 2, further comprising: transmitting means for transmitting signals between said rotary member and said fixed drum, said transmitting means being arranged at a radially more inner position than said first and second annular grooves.

5. A rotary head device according to claim 2, wherein said pressure means include an adjusting member for manually adjusting the pressure.

6. A rotary head device according to claim 2, wherein said pressure means include a magnet and a magnetizable part which is magnetized by said magnet.

7. A rotary head device according to claim 2, wherein said fixed drum has a first outer peripheral surface, said rotary member has a second outer peripheral surface, and wherein said first outer peripheral surface and said second outer peripheral surface have almost the same diameter.

8. A rotary head device according to claim 7, wherein said first outer peripheral surface and said second outer peripheral surface provide a surface for guiding said recording medium.

9. A rotary head device according to claim 2, wherein said ball bearing includes bearing grease and a shield member to shield the bearing grease.

10. A rotary head device according to claim 9, wherein said shield member includes a first annular wall which has a smaller diameter than that of said first and second annular grooves, and a second annular wall which has a larger diameter than that of said first and second annular grooves.

11. A rotary head device according to claim 10, wherein said first and second annular walls are fixed with said fixed drum.

12. A rotary head device comprising:
(a) a fixed drum having a first planar surface part;
(b) a rotary member provided with a head for recording and/or reproducing, said rotary member having a second planar surface part, said first and second planar surface parts being disposed opposite each other;
(c) rotary driving means for driving said rotary member;
(d) a bearing disposed between said first and second planar surface parts, said bearing being arranged to rotatably carry the rotary member; and
(e) attraction means for generating an attractive force between said first planar surface part and said second planar surface part to attract each other.

13. A rotary head device according to claim 12, wherein said attraction means includes an adjustment member for manually adjusting the attractive force.

14. A rotary head device according to claim 12, wherein said attraction means imposes pressure on said bearing by the attractive force.

15. A rotary head device according to claim 12, wherein said attraction means includes a magnet arranged on the side of said first planar surface part, and a magnetizable part magnetized by the magnet arranged on the side of said second planar surface part.

16. A rotary head device according to claim 12, wherein said bearing consists of an annular groove which is formed on said first planar surface part of said fixed drum, another annular groove which is formed on said second planar surface part of said rotary member at a position to confront said annular groove of the fixed drum and rolling members which are inserted between said two annular grooves.

17. A rotary head device according to claim 16, wherein said two annular grooves are respectively formed in annular members which are made from a metal material different from the material of said fixed drum and said rotary member.

* * * * *